United States Patent
Sassen et al.

(10) Patent No.: US 10,693,149 B2
(45) Date of Patent: Jun. 23, 2020

(54) SURVIVOR LOCATOR LIGHT

(71) Applicant: Epsilor-Electric Fuel LTD, Beit Shemesh (IL)

(72) Inventors: Jonathan Sassen, Ramat Beit Shemesh (IL); Yuli Zingerman, Beit Shemesh (IL)

(73) Assignee: EPSILOR-ELECTRIC FUEL, LTD., Beit Shemesh (IL)

( * ) Notice: Subject to any disclaimer, the term of this patent is extended or adjusted under 35 U.S.C. 154(b) by 285 days.

(21) Appl. No.: 15/598,857

(22) Filed: May 18, 2017

(65) Prior Publication Data

US 2018/0337412 A1    Nov. 22, 2018

(51) Int. Cl.
*H01M 6/34* (2006.01)
*H01M 4/08* (2006.01)
(Continued)

(52) U.S. Cl.
CPC ............ *H01M 6/34* (2013.01); *H01M 2/12* (2013.01); *H01M 2/1294* (2013.01); *H01M 2/36* (2013.01); *H01M 4/043* (2013.01); *H01M 4/0471* (2013.01); *H01M 4/08* (2013.01); *H01M 4/364* (2013.01); *H01M 4/48* (2013.01);
(Continued)

(58) Field of Classification Search
None
See application file for complete search history.

(56) References Cited

U.S. PATENT DOCUMENTS 1,011,485 A   12/1911   Pfielderer
1,400,513 A   12/1921   Benner
(Continued)

FOREIGN PATENT DOCUMENTS

EP   0692834   1/1996
WO   WO 1995/030248   11/1995

*Primary Examiner* — Karie O'Neill Apicella
(74) *Attorney, Agent, or Firm* — Robert G. Lev

(57) ABSTRACT

A Water Activated Battery characterized by
a) At least one anode selected from the group consisting of magnesium, aluminum, zinc and alloys thereof;
b) A cathode comprising at least one basic copper salt comprising $Cu(OH)_2$ combined with a copper salt CuX (with n−1 the molar ratio between the CuX and the $Cu(OH)_2$ in the basic copper salt), such that a discharge reaction in saline versus a Mg anode could be written $nMg+Cu(OH)_{2\cdot(n-1)}CuX=Mg(OH)_2+(n-1)MgX+nCu)$ on a skeletal frame, the cathode further comprising a soluble, ionically conductive material;
c) at least one cavity separating said cathode and said at least one anode; and
d) a housing surrounding said at least one anode, cathode and cavity;
(e) a lower aperture at the base of the housing for ingress of water and for expelling of heavier than water products of post immersion reaction, and
(f) an upper aperture located near top of the housing for venting hydrogen generated by the post immersion reaction,
wherein the upper aperture is positioned below the top of housing to create a cavity to provide a void for trapping hydrogen, so that hydrogen is only expelled from the cavity via the upper aperture after a quantity has accumulated, and is expelled in bubbles having a diameter of at least one millimeter.

15 Claims, 5 Drawing Sheets

(51) Int. Cl.

| | |
|---|---|
| *H01M 4/36* | (2006.01) |
| *H01M 4/48* | (2010.01) |
| *H01M 4/58* | (2010.01) |
| *H01M 4/62* | (2006.01) |
| *H01M 4/66* | (2006.01) |
| *H01M 4/04* | (2006.01) |
| *H01M 4/74* | (2006.01) |
| *H01M 6/04* | (2006.01) |
| *H01M 2/12* | (2006.01) |
| *H01M 6/32* | (2006.01) |
| *H01M 2/36* | (2006.01) |
| *H01M 4/76* | (2006.01) |

(52) U.S. Cl.
CPC ........... *H01M 4/58* (2013.01); *H01M 4/5825* (2013.01); *H01M 4/62* (2013.01); *H01M 4/621* (2013.01); *H01M 4/625* (2013.01); *H01M 4/661* (2013.01); *H01M 4/745* (2013.01); *H01M 6/04* (2013.01); *H01M 6/32* (2013.01); *H01M 4/765* (2013.01); *H01M 2220/20* (2013.01)

(56) References Cited

U.S. PATENT DOCUMENTS

| | | |
|---|---|---|
| 6,010,799 A | 1/2000 | Jafri |
| 2017/0237082 A1* | 8/2017 | Goldstein ............. H01M 4/622 429/119 |

* cited by examiner

SURVIVOR LOCATOR LIGHT

BACKGROUND

Passengers and crew of aircraft and seafaring vessels must be provided with life jackets that have Water Activated Batteries (WABs) powering survivor locator lights. WABs for use on ships typically include lithium based power cells which are safe, reliable and economical. However, due to the low probability for explosions, lithium based power cells are forbidden to be used in WABs for aircraft. Instead, WABs have been developed which contain dry electrodes connected to a lamp, such that immersion in water causes the water to enter apertures in the outer casing of the WAB, fill the gap between the electrodes and dissolve a salt contained in the WAB to provide ions so that an ionic current is created between the electrodes powering the lamp.

According to Aerospace Standard AS4492 for Survivor Location Lights, Water Activated Batteries are required to light the lamp with a specified light intensity within ten minutes of immersion in fresh water and within 5 minutes of immersion in seawater, and to maintain this light intensity for at least eight hours. Such Water Activated Batteries are also required to have a long shelf life. Unfortunately humidity tends to cause the same reactions as those that immersion activates, and some parts of the world, such as Jamaica, Florida and Hong Kong, have hot humid environments. The chemicals used in water activated batteries thus need to meet the conflicting requirements of being stable in hot, humid environments, yet easily activated by immersion in water.

Deferred-action batteries of this type have been known for decades, and various embodiments of such batteries and methods for the production and use thereof, as well as for the manufacture of their component parts, have been described, inter alia, in U.S. Pat. Nos. 2,491,640; 2,636,060; 2,655,551; 2,658,935; 2,716,671; 2,817,697; 3,343,988; 3,859,136; 3,953,238; 4,016,339; 4,192,913; 4,261,853; 4,332,864; 4,368,167; 4,487,821; 4,803,135; and 4,822,698.

U.S. Pat. No. 2,491,640 describes a voltaic cell of this type that is intended especially for use in operating an emergency signal at sea. The signal may be a light to indicate the presence of a person who has become stranded by shipwreck or other causes. It may also be an electronic apparatus floating on the water that emits a signal which can be detected at a distant point. The battery is adapted to power the signal and to be activated by immersion in water, which may be the fresh water of an inland lake or river, or the salt water of the ocean.

Such batteries essentially comprise an anode which is usually a magnesium alloy, and a cathode that has traditionally been a silver or copper halide, wherein discharge of the stored energy is initiated by immersing the battery in seawater, which serves as a conducting electrolyte between the anode and the cathode.

Most of the earliest patents that relate to voltaic cells of this type use cathodes based on cuprous chloride, while more recent patents such as U.S. Pat. Nos. 4,192,913 and 4,261,853 describe cathodes based on cuprous thiocyanate.

For example, U.S. Pat. No. 5,424,147 to Khasin et al, describes a water-activated, deferred-action battery having a housing containing at least one cell, comprising at least one anode selected from the group consisting of magnesium, aluminum, zinc and alloys thereof; a cathode comprising a skeletal frame including conductive metal and having a portion of its surface area formed as open spaces, and further comprising a heat-pressed, rigid static bed of active cathode material encompassing the skeletal frame, the cathode material being formed of cuprous chloride, sulfur, carbon and a water-ionizable salt and being compacted and fused under pressure and heat to itself and to the skeletal frame, to form a heat-fused, conductive, electrochemically active phase; at least one cavity separating the cathode and the at least one anode, and at least one aperture leading to the at least one cavity for the ingress of an electrolyte-forming, aqueous liquid.

Other cathodes described in the literature include copper sulfate, lead chloride, copper iodide, lead oxide or potassium persulfate as the active material. However, all of the above materials suffer from one or more of the following problems:

Sensitivity to humidity upon storage resulting in expansion of the cathode until the cavity between the anode and cathode no longer exists Shorting the electrodes and discharging the battery, fast dissolution in water upon activation which results in early failure High cost Use of toxic materials.

Various methods are well known to protect cathodes from high humidity. These include water soluble films that have a low water vapor transmission rate (WVTR), and mechanical plugs that block the apertures that are automatically removed by inflating the lifejacket. Unfortunately such water soluble films only have a low WVTR in low or medium humidity, but in high humidity the films have a high WVTR and so are not effective. In addition after prolonged storage of many years it may take many minutes for them to dissolve. Automatic removal of plugs is an expensive and bulky addition to each lifejacket.

While remaining fully compliant with International Aerospace Standards, there is an interest in prolonging the product life of survivor locator lights in high humidity environments, in shortening the period for the light to come on following immersion, and in reducing unit cost.

SUMMARY OF THE INVENTION

A first aspect of the invention is directed to providing a Water Activated Battery comprising:
a) at least one anode selected from the group consisting of magnesium, aluminum, zinc and alloys thereof;
b) a cathode comprising a skeletal frame supporting at least one basic copper salt comprising $Cu(OH)_2$ combined with a copper salt $(n-1)CuX$ (with $(n-1)$ being the molar ratio between the CuX and the $Cu(OH)_2$ in the basic copper salt), such that a discharge reaction in saline versus a Mg anode could be written $nMg+Cu(OH)_{2 \cdot (n-1)}CuX = Mg(OH)_2 + (n-1)MgX + nCu$ the cathode further comprising a soluble, ionically conductive material;
c) at least one cavity separating said cathode and said at least one anode; and
d) a housing surrounding said at least one anode, cathode and cavity;
e) a lower aperture at the base of the housing for ingress of water and for expelling of heavier than water solid products of post immersion reaction, and
(f) an upper aperture located near top of the housing for venting hydrogen generated by the post immersion reaction,
wherein said upper aperture is positioned below the top of the cavity provide a void for trapping hydrogen, so that hydrogen is only expelled from the cavity via the aperture after a quantity has accumulated, and is expelled in large bubbles.

Typically, the basic copper salt is selected from the list comprising basic copper sulfate, basic copper carbonate, basic copper acetate (verdigris) and basic copper chloride.

Optionally, the basic copper salt is compacted and fused to itself and to the skeletal frame, to form a heat-fused, conductive, electrochemically active material.

In some embodiments, a portion of a surface of the cathode is formed as open spaces.

Typically, the cathode further comprises an electronically conductive material.

Typically, said electronically conductive material is selected from the group comprising graphite, carbon black and carbon fibers.

Typically the ionically conductive material comprises a salt of an alkali, alkali earth element or a transition metal.

Typically, the ionically conductive material comprises a halide or a sulfate.

Typically the ionically conductive material further comprises a non-hygroscopic soluble salt.

Optionally, the binder material comprises a Fluoropolymer, a kaolin, a wax or sulfur.

In some embodiments, the cathode material is fused to itself by heating during or after compression.

In some embodiments, the cathode material further comprises copper sulfate.

Optionally, the anode and cathode are parallel flat plates.

Alternatively, the anode is a hollow cylinder and the cathode is a smaller cylinder nested within the anode without contact between the anode and cathode.

Alternatively, again, the cathode is a hollow cylinder and the anode is a smaller cylinder nested within the cathode without contact between the anode and cathode.

BRIEF DESCRIPTION OF FIGURES

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in, the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a perspective, schematic view of a preferred embodiment of the battery according to the invention;

FIG. 2 is a perspective, schematic view of the cathode;

FIG. 3 is a schematic illustration of a prior art battery with a housing having a first aperture at the base and a second aperture at the top; the battery being immersed in water and showing heavy products of battery reaction being egressed from the lower aperture and hydrogen micro-bubbles being vented from the top aperture;

Figure 3:
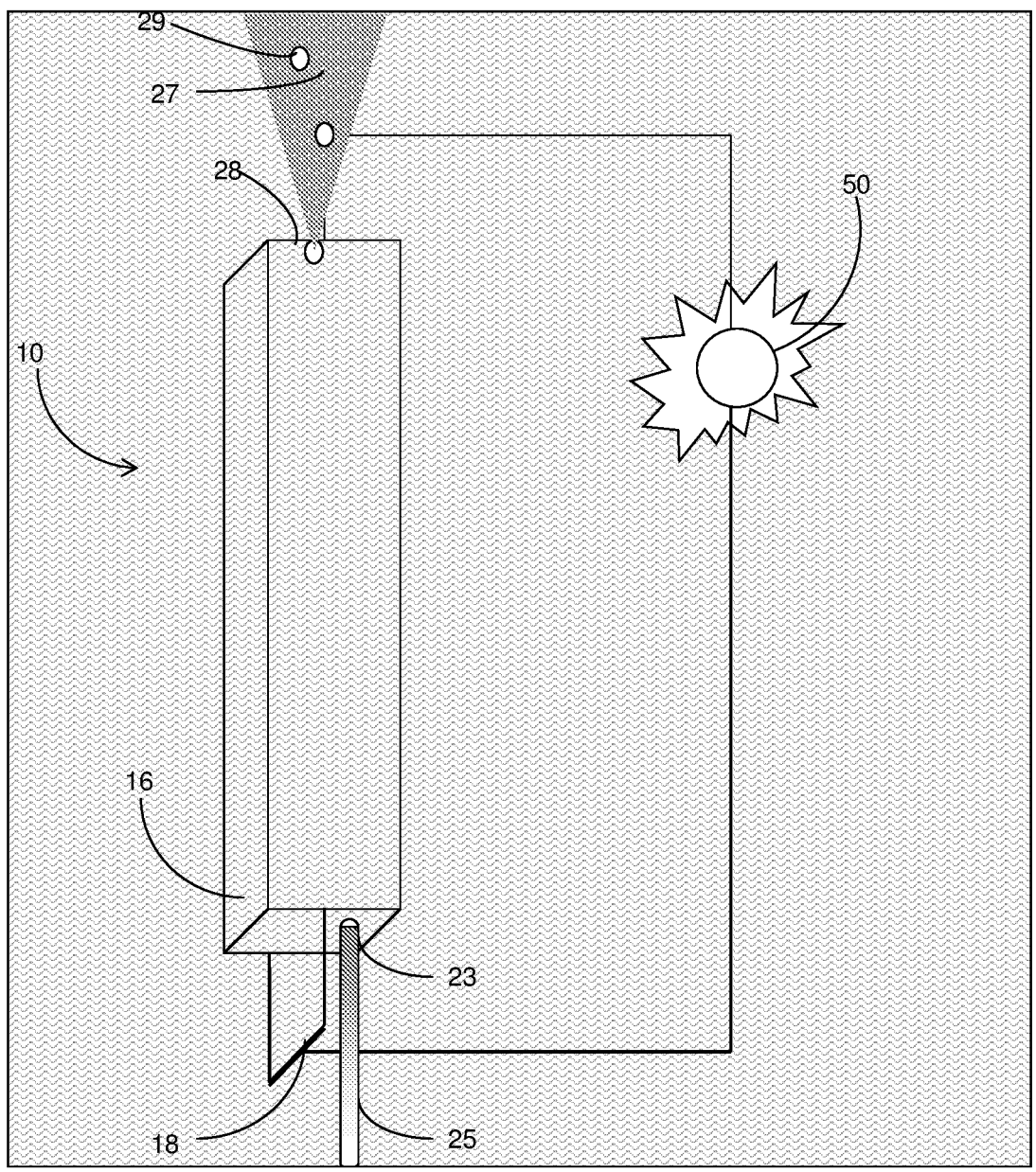
Figure 4:
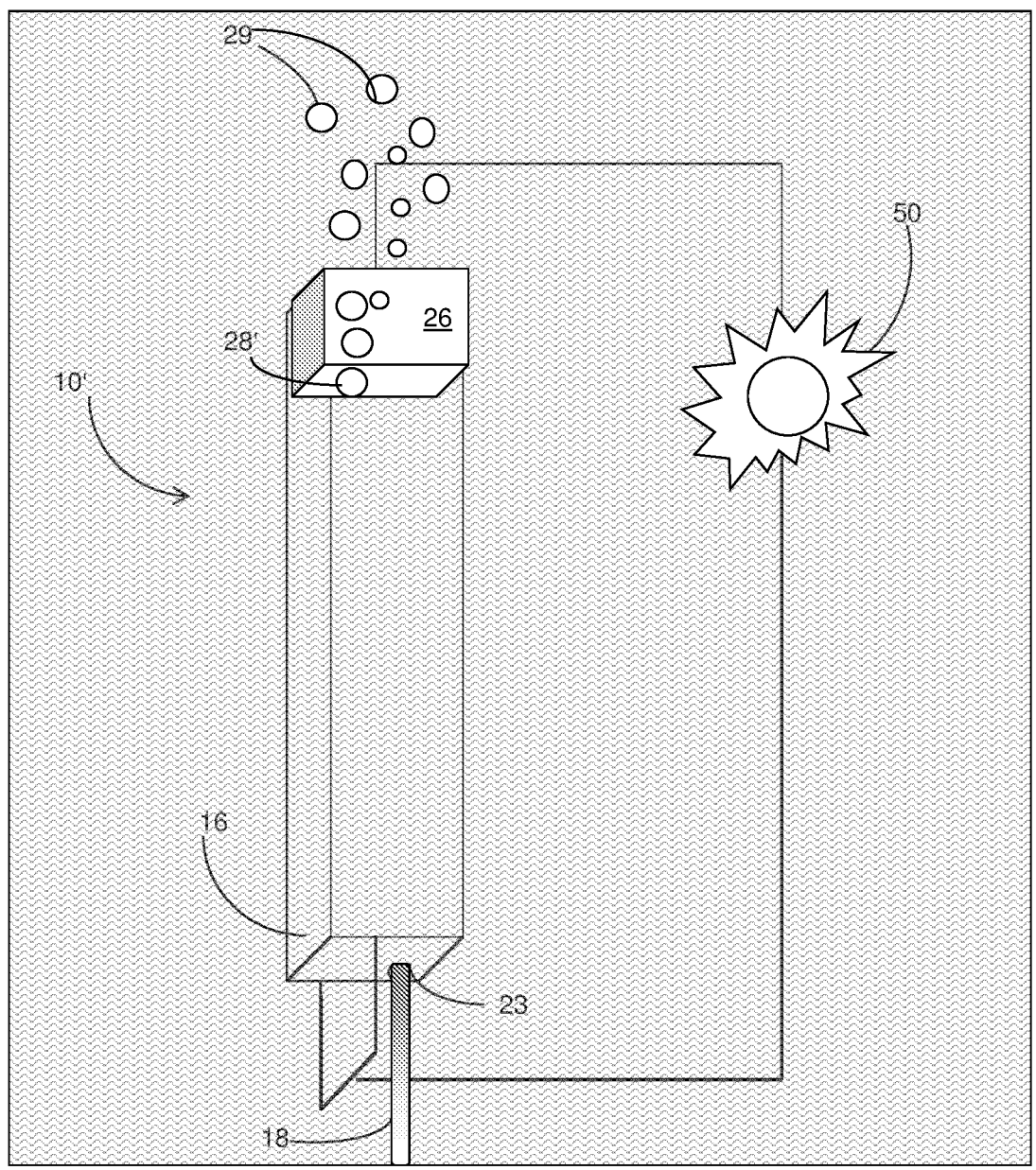
Figure 5A:
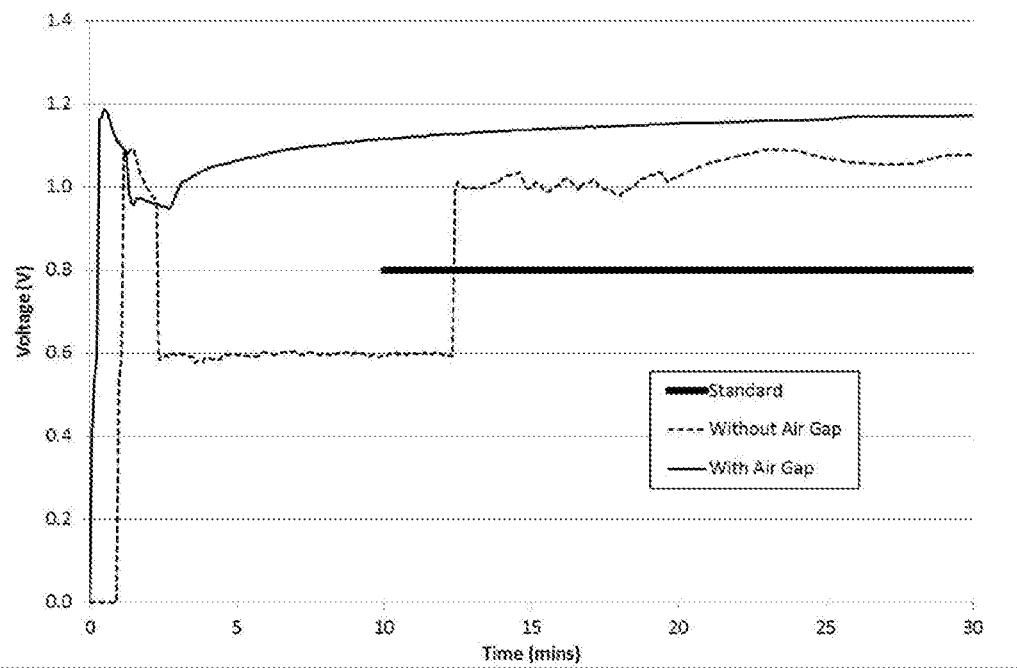
Figure 5B:
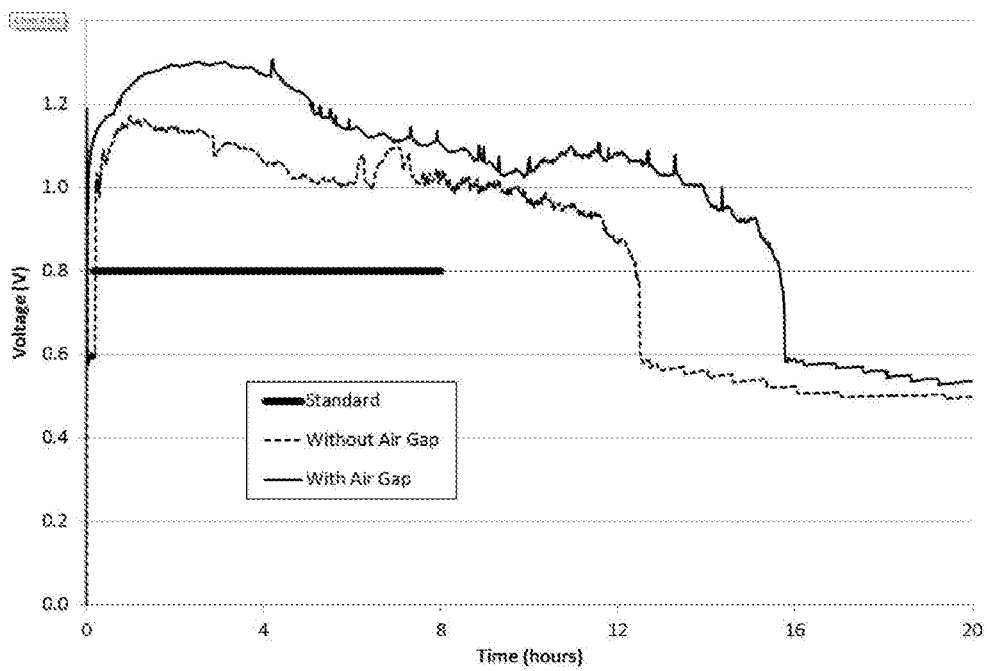

FIG. 4 is a schematic illustration of a battery of the invention with a housing having a lower aperture at the base and an upper aperture at the top; the battery being immersed in water and showing heavy products of battery reaction being egressed from the lower aperture and, due to the void above the top aperture, hydrogen accumulating in the void and being vented from the upper aperture as large bubbles;

FIG. 5a is a graph showing the difference in activation time between the prior art battery shown in FIG. 3 and the battery of the present invention shown in FIG. 4, and FIG. 5b is a graph showing the difference in active discharge life between the prior art battery shown in FIG. 3 and the battery of the present invention shown in FIG. 4.

DESCRIPTION OF EMBODIMENTS

The present invention relates to water-activated, deferred-action batteries and to a method for producing a cathode for such batteries.

More particularly the present invention relates to a deferred-action battery which is adapted to be activated by immersing it in water. Such batteries may be used for automatically powering emergency lamps and sirens on life-jackets and in case of flooding, for example.

Embodiments of the invention are directed to such survivor locator lights and their batteries.

There are standard humidity tests such as SAE International Aerospace Standard (AS) 4492 Survivor Locator Lights, December 1995 and reaffirmed Nov. 18, 2004, RTCA/DO-160C and RTCA/DO-160E that such batteries and lamps must pass.

While remaining fully compliant with International Aerospace Standards, there is an interest in prolonging the product life of survivor locator lights in high humidity storage conditions, in shortening the period for the light to come on following immersion, and reducing unit costs. Embodiments of the invention are directed to such survivor locator lights and their batteries.

Figure 1:
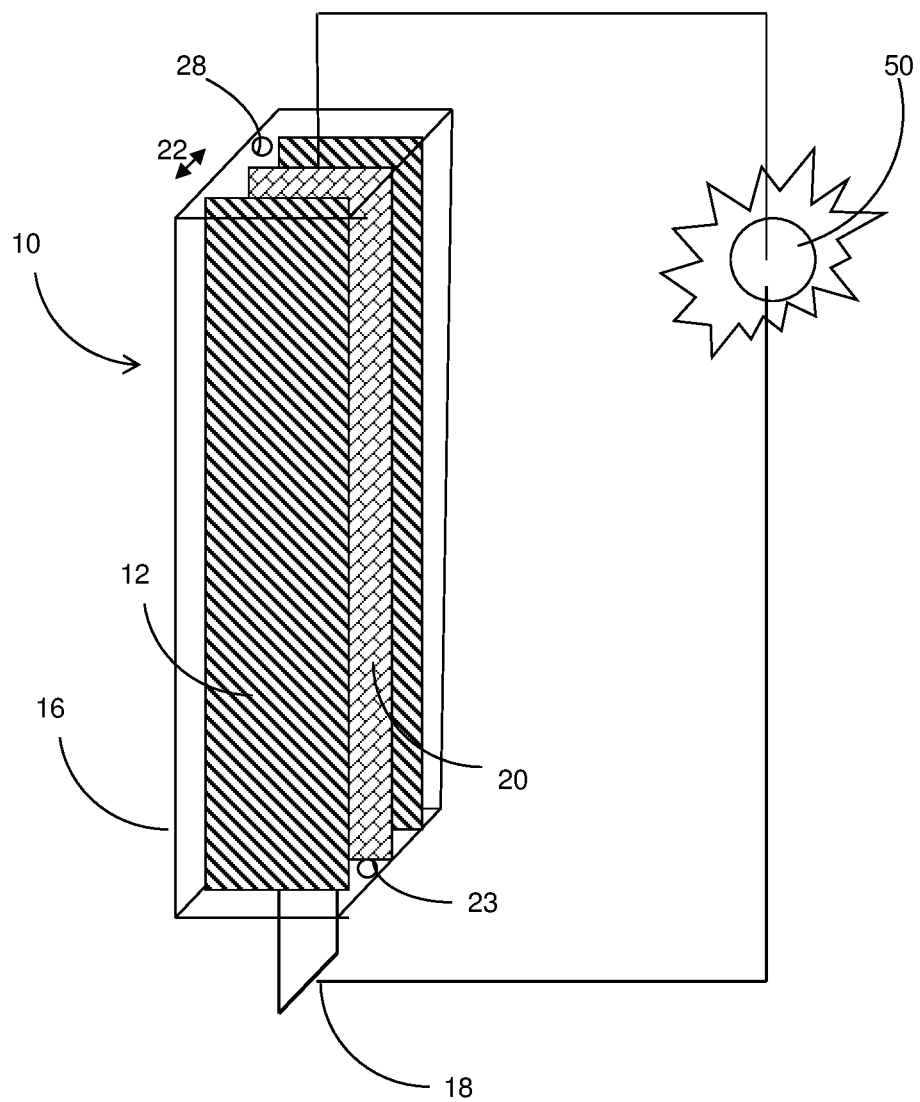

With reference to FIG. 1 a water-activated, deferred-action battery 10 having a single cell is shown. The battery 10 consists of two spaced-apart anodes 12, each having the form of a thin plate. Anodes 12 are made of a metal selected from the group comprising magnesium, aluminum, zinc, and alloys thereof. Particularly preferred is a magnesium alloy.

Each anode 12 is held in parallel, adjacent relationship to a major inner face 14 of a plastic battery housing 16. Both anodes 12 are connected in parallel to a negative terminal 18, accessible from outside housing 16.

A cathode plate 20 that is typically thicker than the anodes 12, but has about the same area as each anode 12, is positioned between the anodes 12. A cavity 22 containing air and, optionally, separator layers (not shown) is included between the cathode plate 20 and each anode 12 to electrically insulate the cathode 20 from the anode 12 while the battery 10 is in its inactivated state. The battery has a housing 16 that is typically plastic. Two apertures 23, 28 are provided in the case 14, one near its base and the second one near the top of the case. Both cavities connect the cavity 22 to the environment outside the case 14. The aperture 23 has an inlet 23 at the base of the housing 16, and serves for the ingress of an electrolyte-forming aqueous liquid, typically water and also allows reaction products such as solid hydroxides and oxides to be emitted from the cavity 22. The second aperture 28 is an outlet near the top of the housing 16 that, on immersion of the battery 10 into water, serves to allow air to escape from the housing 16 so that water can enter the battery 10 to start power-producing operation. The aperture 28 also allows the escape of hydrogen subsequently evolved during operation of the battery 10. In a preferred embodiment, the higher aperture 25 is located on an opposite surface of the housing 16. In some embodiments, more than one venting aperture 28 is provided.

The battery 10 is usually directly and switchlessly connected to a lamp 50 and is generally attached to a lifejacket (not shown). On immersion into water, the battery 10 is activated and the lamp is illuminated.

In co-pending Application number U.S. Ser. No. 15/041, 401 also filed as PCT application number PCT/IL2017/050026 titled "Water Activated Battery" Applicant disclosed the cathode plate 20 including a basic copper salt such as basic copper sulfate or basic copper carbonate. The basic copper salt has a low aqueous solubility, so usefully, unlike the battery described in U.S. Pat. No. 5,424,147 to Khasin et al, the apertures 23, 28 of batteries in accordance with the present battery 10 do not require sealing by a water soluble film to protect the battery 10 before use to extend its shelf-life. The absence of this film decreases the activation time, decreases the product complexity and so also lowers fabrication costs.

The cathode plate 20 is fabricated from a number of materials, but especially a basic copper salt such as basic copper sulfate, basic copper carbonate, basic copper acetate (verdigris) $Cu(CH_3COO)_2.CuO.xH_2O$ and basic copper chloride $CuCl_{2.3}Ca(OH)_2$.

Since basic copper sulfate and the other basic copper salts listed are substantially insoluble in water, usefully, unlike the battery described in U.S. Pat. No. 5,424,147 to Khasin et al, the apertures 23, 28 of batteries in accordance with the present battery 10 do not require sealing by a water soluble film to protect the battery 10 before use and to extend its shelf-life.

The active cathode material may further include carbon to provide electrons, sulfur, a polymeric binder such as a Fluoropolymer, wax and/or a water-ionizable salt. The carbon may suitably be provided as graphite, carbon fibers or carbon black, where carbon black is preferred.

The water ionizable salt is provided to provide ions on immersion into fresh water, such as a lake, for example.

The discharge reaction of basic copper sulfate against a Mg based anode in water could be:

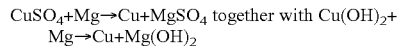

$CuSO_4+Mg \rightarrow Cu+MgSO_4$ together with $Cu(OH)_2+Mg \rightarrow Cu+Mg(OH)_2$ The reason that sulfur may be added is that sulfur present in the cathode converts any copper produced by these discharge reactions to CuS, which increases the energy content of the battery.

There is also some parasitic reaction of Mg with water giving hydrogen gas.

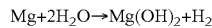

$Mg+2H_2O \rightarrow Mg(OH)_2+H_2$

Figure 2:
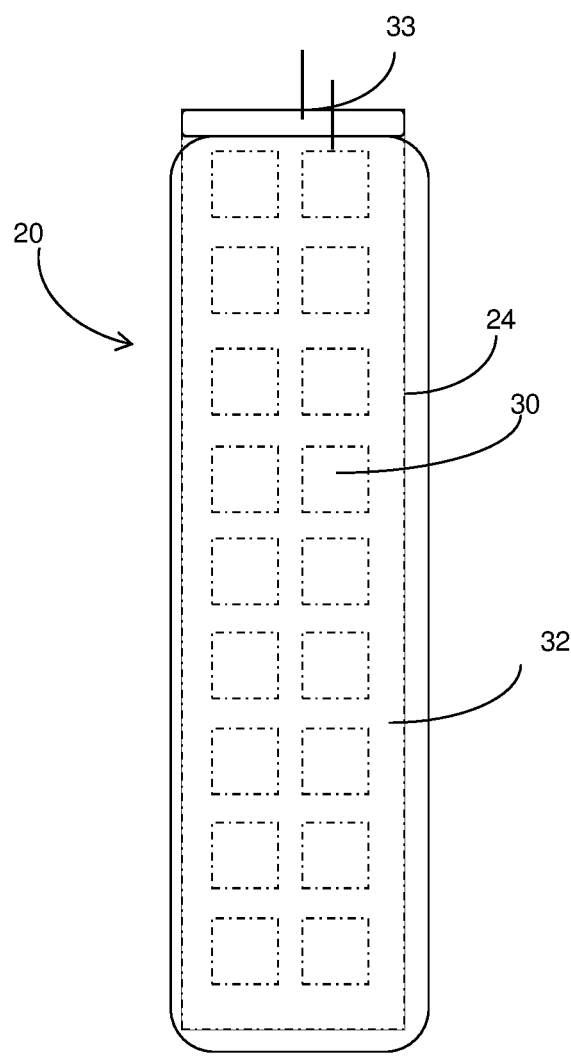

Referring now to FIG. 2, one embodiment of the cathode plate 20 is shown in further detail. The cathode plate 20 comprises a skeletal frame 24 including a conductive metal and having a portion of its surface area formed as open spaces 30. The main bulk of the cathode plate 20 comprises a heat-pressed, rigid, static bed 32 of active cathode material including basic a copper salt such as basic copper sulfate or basic copper carbonate encompassing the skeletal frame 24.

The cathode plate 20 is compacted and fused under pressure and heat to itself and to the skeletal frame 24, to form a heat-fused, conductive, electrochemically-active phase. As with many sintering operations, the strength of the form thus produced can be improved by the addition of a suitable binder material; advantageously, fluorinated ethylene propylene and/or kaolin may be added to act as a supplementary binder. The skeletal frame 24 is electrically connected to a positive terminal 33 which is accessible from outside the housing 16.

A basic copper sulfate cathode 20 was prepared as follows:

$CuSO_4.3Cu(OH)_2.H_2O$ 4 gm (Northern Michigan Aquatics), sulfur 1.2 gm (Aldrich), carbon black 1 gm (Cabot), sodium chloride 0.25 gm (Aldrich), and FEP powder 0.8 gm (DuPont) were weighed into a Pascal blender and blended for two hours. The 8 g mix was transferred to the cylinder of a piston and cylinder type die, wherein the cylinder had a die recess with an open area of 72.5 mm. First, 4 gm of the mix was poured into the die cylinder and leveled, then the cathode current collector (a pre-tabbed copper expanded metal sheet, approximately 20 mesh, obtained from the Dexmet Corp. or a Titanium strip) was laid over this, and a further 4 g portion of mix added to the die cylinder and leveled.

The standard die was then closed with its mating piston section. The closed die was then heated to 110° C. in a 5 ton press with heated platens (PHI), and the mix pressed for four minutes. After cooling and removing the compact from the die, the cathode was observed to be robust and uniform, with a thickness of 5 mm.

With reference to FIG. 3, the battery of FIG. 1 including the cathode 20 described above was connected to a lamp. Shortly after immersion of the battery of FIG. 3 into fresh water, a steady stream of micro-bubbles 27 with occasional large bubbles 39 were emitted from the upper outlet 28 and the lamp 50 lit up. Detritus 25 was expelled from the lower aperture 23. However, the battery took almost an hour to activate correctly, which is well after the time required by the AS4492 specification. It seems that sodium and chlorine ions were washed out of the battery by the stream of micro-bubbles 27 and so an insufficient concentration of ions built up in the cavity 22 of the battery 10 within the specified time as shown in FIG. 5. With reference to FIG. 4, in a modified battery 10' substantially identical to the battery 10 of FIG. 3, mutatis mutandis, but where the upper aperture 28' is a few millimeters below the top of the housing 16 leaving a cavity 26 within the housing 16 above the upper aperture 28. When immersed in water, the micro-bubbles flow up into the cavity 26, and, once this is full of hydrogen, bubbles of hydrogen 29 are emitted by the aperture 28'. This time the lamp 50 lit up well within the specified time and remained lit as shown in FIG. 5. It seems that the cavity 26 above the aperture 28 that traps hydrogen results in large bubbles of hydrogen being vented. Without wishing to be bound by theory, it is believed that these larger bubbles of hydrogen 29 mean that there is a much smaller surface of hydrogen—fluid interface around the hydrogen emitted and less ions are dragged out of the housing 16 either in the surface layer or in the wake of these bubbles, resulting in the solution coupling the cathode 20 to the anodes 11 becoming ion rich substantially faster. The lamp lit up 50 and stayed lit for many more hours than required by the AS4492 specification. In the present invention the quantity of hygroscopic salt required in the battery may be greatly reduced by reducing the rate at which it escapes from the battery cavity. Alternatively the present invention can enable the use of less soluble salts that are not hygroscopic. These salts would not reach a high enough concentration in the battery cavity to activate the bulb correctly without the present invention. By enabling the use of non-hygroscopic salts, the shelf-life of the batteries in humid environments is increased.

With reference to FIG. 5a, a graph comparing the activation times of the prior art battery of FIG. 3 (without the addition of an air-gap in the top of the case) with the battery of the present invention with the addition of an air-gap as illustrated FIG. 4 is shown. Without the addition of the airgap the battery takes too long to light up and does not accord with the demands of the AS4492 standard.

With reference to FIG. 5b a graph showing the difference in active discharge life due to immersion into cold, fresh water between the prior art battery of FIG. 3 and the battery of the present invention as illustrated in FIG. 4 is shown.

The minimum voltage for the specified light output is 0.8 volts. It is clearly demonstrated that the current lasts much longer where an air gap is provided despite the fact that the size of the cathodes 20 is actually reduced.

It will be appreciated that having a shorter cathode 20 or cutting off one or both top corners of the cathode 20 is another way to create a cavity 22 for allowing trapped hydrogen to accumulate.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A Water Activated Battery characterized by
a) At least one anode selected from the group consisting of magnesium, aluminum, zinc and alloys thereof;
b) A cathode comprising on a skeletal frame, at least one basic copper salt selected from the list comprising basic copper sulfate and basic copper carbonate; the cathode further comprising a soluble, ionically conductive material;
c) at least one cavity separating said cathode and said at least one anode;
d) a housing surrounding said at least one anode, cathode and cavity;
e) a lower aperture at the base of the housing for ingress of water and for expelling of heavier than water products of post immersion reaction; and,
f) an upper aperture located near top of the housing for venting hydrogen generated by the post immersion reaction, wherein said upper aperture is positioned a few millimeters below the top of housing to create a cavity within the housing, said hydrogen being expelled in bubbles defined by diameter of the upper aperture, and having a diameter of at least one millimeter.

2. The Water activated battery of claim 1, wherein the cavity is provided by either the cathode being shorter than the anode and the housing and/or by cutting off one or both corners of the cathode.

3. The water-activated, deferred-action battery of claim 1, wherein the basic copper salt is compacted and fused to itself and to the skeletal frame, to form a heat-fused, conductive, electrochemically active material.

4. The water-activated, deferred-action battery of claim 1, wherein a portion of a surface of the cathode is formed as open spaces.

5. The water-activated, deferred-action battery of claim 1, wherein the cathode further comprises an electronically conductive material optionally selected from the group comprising graphite, carbon black and carbon fibers.

6. The water-activated, deferred-action battery of claim 1, wherein the cathode further comprises a kaolin.

7. The water-activated, deferred-action battery according to claim 1, wherein the ionically conductive material comprises at least one of:
i) a salt of an alkali, alkali earth element or a transition metal;
ii) a halide or a sulfate.

8. The water-activated, deferred-action battery of claim 1, wherein the cathode further comprises a binder material.

9. The water-activated, deferred-action battery of claim 8, wherein the binder material comprises at least one of a polymeric material, a wax and sulfur.

10. The water-activated, deferred-action battery of claim 1 wherein the cathode material is fused to itself.

11. The water-activated, deferred-action battery of claim 1, wherein the anode and cathode are parallel flat plates.

12. The water-activated, deferred-action battery of claim 1, wherein the anode comprises a hollow cylinder and the cathode comprises a smaller cylinder nested within the anode without contact between the anode and cathode.

13. The water-activated, deferred-action battery of claim 1, wherein the cathode comprises a hollow cylinder and the anode comprises a smaller cylinder nested within the cathode without contact between the anode and cathode.

14. The water-activated, deferred-action battery of claim 1, wherein the cathode material comprises at least one basic copper salt on a skeletal frame and further comprising a readily soluble non-hygroscopic ionic salt.

15. The water-activated, deferred-action battery of claim 14, wherein the readily soluble non-hygroscopic ionic salt is selected from the group comprising Copper(II) formate hydrate [$Cu(HCO_2)2.H_2O$], Sodium ferrocyanide decahydrate [$K_4Fe(CN)_6.10H_2O$], Potassium ferricyanide [$K_4Fe(CN)_6.10H_2O$] [$K_3Fe(CN)_6$], Potassium sulfate [$K_2SO_4$] and Calcium lactate pentahydrate [[$CH_3CH(OH)COO]_2Ca\cdot 5H_2O$], Sodium Citrate Monobasic [$HOC(COONa)(CH_2COOH)_2$], Magnesium Formate Dihydrate [$C_2H_2MgO_4\cdot 2H_2O$].

* * * * *